United States Patent
Brunet

(10) Patent No.: US 7,436,093 B2
(45) Date of Patent: Oct. 14, 2008

(54) TURBOMOLECULAR VACUUM PUMP

(75) Inventor: Maurice Brunet, Sainte Colombe Pres Vernon (FR)

(73) Assignee: Societe de Mecanique Magnetique, Saint Marcel (FR)

( * ) Notice: Subject to any disclaimer, the term of this patent is extended or adjusted under 35 U.S.C. 154(b) by 381 days.

(21) Appl. No.: 10/575,305

(22) PCT Filed: Oct. 14, 2004

(86) PCT No.: PCT/FR2004/002616
§ 371 (c)(1),
(2), (4) Date: Apr. 11, 2006

(87) PCT Pub. No.: WO2005/038263
PCT Pub. Date: Apr. 28, 2005

(65) Prior Publication Data
US 2007/0132327 A1 Jun. 14, 2007

(30) Foreign Application Priority Data
Oct. 16, 2003 (FR) .................................. 03 12111

(51) Int. Cl.
*F04D 19/04* (2006.01)
*H02K 7/09* (2006.01)

(52) U.S. Cl. ...................... 310/90.5; 310/68 R; 310/71; 417/423.4

(58) Field of Classification Search ............... 310/68 R, 310/71, 90.5; 417/423.4
See application file for complete search history.

(56) References Cited

U.S. PATENT DOCUMENTS

| 4,023,920 | A |   | 5/1977 | Bachler et al. |
| 4,082,376 | A | * | 4/1978 | Wehde et al. ............... 310/90.5 |
| 5,032,751 | A | * | 7/1991 | Morita ....................... 310/90.5 |
| 5,469,007 | A | * | 11/1995 | Toyama ...................... 310/90.5 |
| 6,644,938 | B2 | * | 11/2003 | Omori ........................ 417/353 |
| 6,793,466 | B2 | * | 9/2004 | Miyamoto ................... 417/313 |
| 7,090,469 | B2 | * | 8/2006 | Blumenthal et al. ........... 417/32 |

FOREIGN PATENT DOCUMENTS

FR  2 747 431  10/1997
JP  1 195994  * 8/1989

* cited by examiner

*Primary Examiner*—Burton Mullins
(74) *Attorney, Agent, or Firm*—Weingarten, Schurgin, Gagnebin & Lebovici LLP

(57) ABSTRACT

The turbomolecular vacuum pump with active magnetic bearings comprises an enclosure (110) defining a primary vacuum chamber (116), a rotor (120), an electric motor (107), an axial magnetic bearing (103), radial magnetic bearings (101, 102), an axial detector (106), and radial detectors (104, 105). Remote external electric circuits associated with the electric motor (107) and with the axial and radial magnetic bearings (103 and 101, 102) essentially comprise power supply electric circuits (191). Circuits (194) for controlling the axial and radial magnetic bearings (103 and 101, 102) from signals issued by the axial and radial detectors (106 and 104, 105) are embedded in a resin and placed inside the enclosure (110) in the primary vacuum chamber (116). A hermetic leaktight electrical connector (180) and an electric cable (183, 184) providing a connection with the remote external electric circuits (191, 192) each have a number of connection wires that is less than ten.

12 Claims, 3 Drawing Sheets

US 7,436,093 B2

TURBOMOLECULAR VACUUM PUMP

This application is a §371 national phase filing of PCT/FR2004/002616 filed Oct. 14, 2004, and claims priority to French application No. 03 12111 filed Oct. 16, 2003.

The present invention relates to turbomolecular vacuum pumps.

Turbomolecular vacuum pumps are known for general applications that are relatively inexpensive and that comprise rotary members mounted on ceramic ball bearings. Nevertheless, such turbomolecular vacuum pumps are not sufficiently robust or reliable for specific applications, for example applications in the fabrication of semiconductors, making coatings on glass fibers, or using electron microscopes.

Under such circumstances, it is preferable to use turbomolecular vacuum pumps in which the rotary members are mounted on magnetic bearings that make it possible to achieve speeds of rotation that are very high, with great reliability and great robustness, and without any risk of pollution since there is no lubricant.

Thus, as disclosed for example in U.S. Pat. No. 4,023,920, turbomolecular vacuum pumps are known having active "5-axis" magnetic bearings, i.e. comprising an axial magnetic bearing and two radial magnetic bearings associated with detectors for detecting the axial and radial positions of the turbomolecular vacuum pump rotor, and with electronic servo-control circuits for correcting any displacement of the rotor in translation along the three axes of a rectangular frame of reference or in tilting about two tilt axes.

Essentially, a prior art turbomolecular vacuum pump with active magnetic bearings has the structure shown in FIG. 3.

A vertical rotor 20 is mounted inside an enclosure 10 on first and second radial magnetic bearings 1 and 2 situated on either side of an electric motor 7 having windings 71. Each radial magnetic bearing 1, 2 has electromagnet windings 11, 21 forming part of a stator that is mounted in stationary manner inside the enclosure 10 and that co-operates with an armature placed on the rotor 20. The top radial magnetic bearing 1 may be greater in size than the bottom radial magnetic bearing 2, but it should be observed that the rotor 20 could also be located in any position other than vertical.

Radial detectors 4 and 5 for detecting the radial position of the rotor 20 are disposed in the vicinity of the radial magnetic bearings 1, 2. These radial detectors 4, 5 may be of the inductive type, for example, having windings 41, 51, but they could equally well be of the capacitive type or of the optical type, for example.

An axial magnetic thrust bearing 3 with stator windings 31a, 31b is disposed at the bottom end of the rotor and cooperates with a rotor armature perpendicular to the axis of the rotor 20. An axial detector 6 detects the axial position of the rotor 20 and is located on a stationary plate 15 secured to the enclosure 10, in the vicinity of the bottom end of the rotor 20.

All of the above-described elements (electric motor 7, radial magnetic bearings 1 and 2, axial magnetic bearing 3, radial detectors 4 and 5, and axial detector 6) are disposed in the chamber 16 defined inside the enclosure 10 in which there exists a primary vacuum where the pressure is of the order of a few millibars (mbar) to one-thousandth of a millibar. A hermetic leaktight connector 80, typically having 54 contacts, is needed to pass through the wall of the enclosure 10 in leaktight manner the wires for powering and controlling the motor 7, the bearings 1, 2, and 3, and the detectors 4, 5, and 6, and to connect them to a connection cable 83, itself typically having 54 wires and connecting the electrical members inside the pump to a control unit 91 to 94 that is situated outside the enclosure 10, in the normal ambient atmosphere, and at a greater or lesser distance from the pump proper.

The control unit 91 to 94 generally comprises general power supply circuits 91 connected by a cable 81 to an electrical power supply, interface circuits 92 for communicating with a system external to the vacuum pump and connected via an interface cable 82 to said external system, circuits 93 for controlling the electric motor 7, and circuits 94 for controlling the axial and radial magnetic bearings 3 and 1, 2.

The connection cable 83 and the leaktight connector 80 are components that are expensive because of the large number of wires or contacts (typically 54 wires), and they contribute significantly to the cost of a magnetic suspension for the rotor of a turbomolecular vacuum pump.

Proposals have also been made to bring certain external elements of the control lock closer to the pump in order to reduce the cost of the connection cable, but it still remains necessary to use a leaktight connector having several tens of wires or contacts, and which is therefore very expensive, given the multiplicity of elements inside the pump (motor, bearing windings, position detectors) that need to be connected to the external circuits of the control unit 91 to 94.

The present invention seeks to remedy the above-mentioned drawbacks and it enables a turbomolecular vacuum pump to be made with active magnetic bearings that retains all of the advantages in terms of robustness and reliability of that type of magnetic suspension, while presenting a manufacturing cost that is greatly reduced and that comes close to that of turbomolecular vacuum pumps having ceramic ball bearings.

In accordance with the invention, these objects are achieved by a turbomolecular vacuum pump having active magnetic bearings, the pump comprising an enclosure defining a primary vacuum chamber, a rotor mounted inside the enclosure, an electric motor for rotating the rotor relative to the enclosure, at least one axial magnetic bearing, and at least one radial magnetic bearing for supporting the rotor relative to the enclosure, at least one axial detector for detecting the axial position of the rotor relative to the enclosure, at least one radial detector for detecting the radial position of the rotor relative to the enclosure, a hermetic leaktight electrical connector mounted in the wall of the enclosure, and at least one electric cable providing a connection with remote external electric circuits associated with the electric motor, and with the axial and radial magnetic bearings, the pump being characterized in that the remote external electric circuits associated with the electric motor and with the axial and radial magnetic bearings essentially comprise general power supply circuits for electrically powering the electric motor and the axial and radial magnetic bearings, in that circuits for controlling the axial and radial magnetic bearings on the basis of signals issued by the axial and radial detectors are embedded in a resin and placed inside the enclosure in the primary vacuum chamber, and in that the leaktight electrical connector and the electric cable providing a connection with the remote external electric circuits each comprises a number of connection wires that is less than ten.

The remote external electric circuits may further comprise circuits providing a communications interface with a system external to the vacuum pump.

Insofar as most of the connections of the detectors, the radial magnetic bearings, and the axial magnetic bearing do not pass through the leakproof wall of the pump enclosure, it is possible to use a leaktight connector having a small number of contacts and thus of reduced cost, and in the same manner the external connection cable has only a small number of wires, thereby reducing the cost of manufacture. Further-more, electrical circuits of relatively low power can be incorporated inside the primary vacuum chamber at low cost and in convenient manner.

In a preferred embodiment, the turbomolecular vacuum pump includes circuits for controlling the electric motor that are mounted on a bottom plate of the enclosure on the outside thereof, the connection electric cable comprises a first connection cable between the leaktight electrical connector and the circuits for controlling the electric motor, and a second connection cable between the circuits for controlling the electric motor and the remote external electric circuits, and the first connection cable has a number of connection wires that is less than ten, while the second connection cable has a number of connection wires that is less than five.

This disposition makes it possible to further reduce the number of wires in the second connection cable and it can therefore be made to be long without any drawback in order to provide a connection with external electric circuits that are located remotely at a distance therefrom.

Preferably, the first connection cable has a number of connection wires that is less than eight, while the second connection cable has a number of connection wires that is less than four.

Advantageously, the circuits for controlling the axial and radial magnetic bearings are placed in the bottom of the enclosure.

Under such circumstances, in a particular embodiment, a cooling circuit external to the pump surrounds a portion of the enclosure housing the circuits for controlling the axial and radial magnetic bearings.

In an advantageous particular embodiment, the circuits for controlling the axial and radial magnetic bearings include a plate having a bottom face facing towards the wall of the enclosure and carrying power components for powering the axial and radial magnetic bearings, and a top face facing towards the inside of the enclosure and carrying components for processing signals issued by the axial and radial detectors.

The circuits for controlling the axial and radial magnetic bearings may be placed in an aluminum housing. The electronic components are preferably embedded in a bubble-free resin.

Assembly is particularly easy if the circuits for controlling the axial and radial magnetic bearings are mounted on a removable bottom plate of the enclosure, on the inside thereof. The bottom plate of the enclosure may be made of aluminum, for example.

Other characteristics and advantages appear from the following description of particular embodiments, given as examples and with reference to the accompanying drawings, in which.

Figure 1:
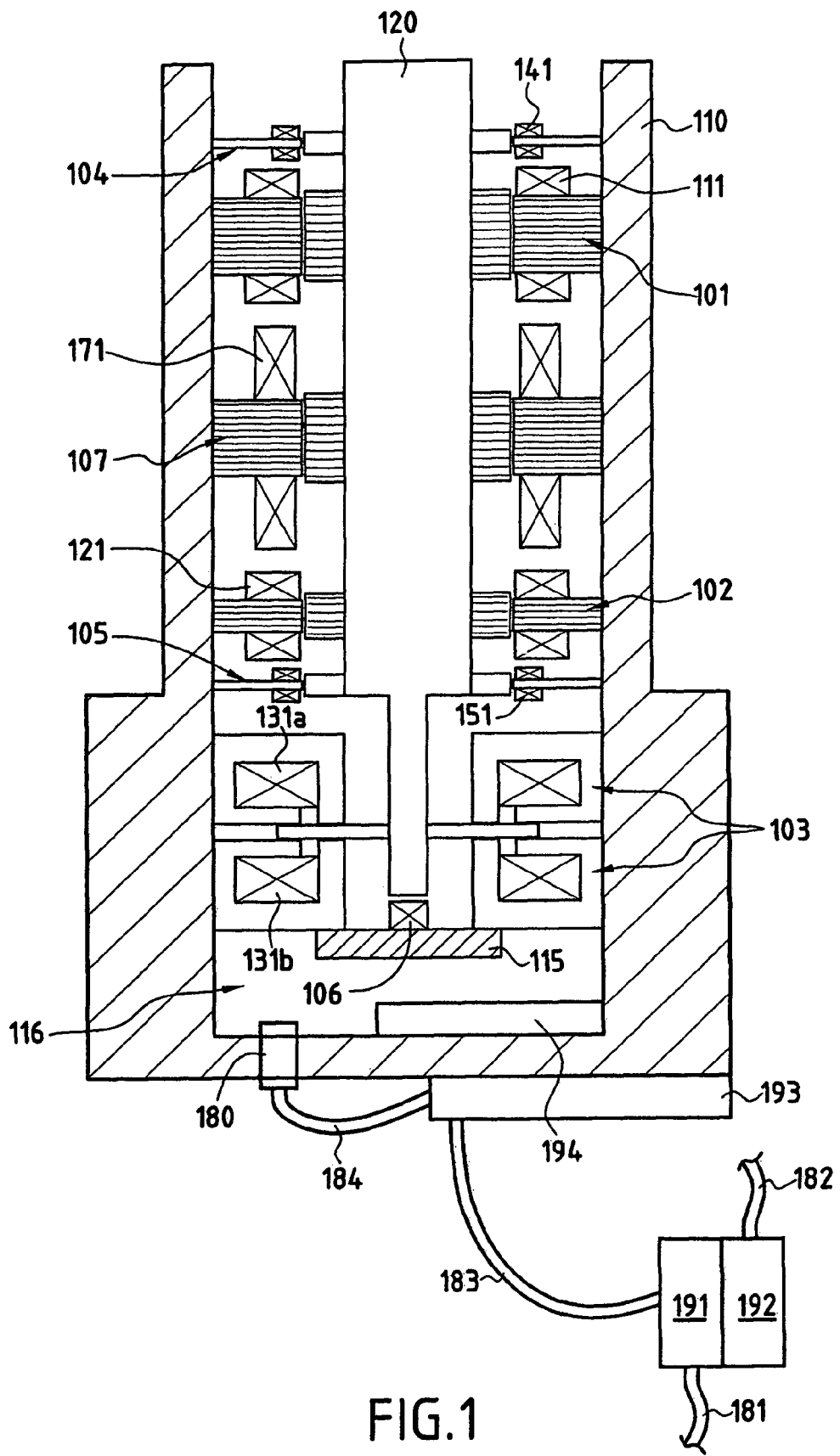
FIG. 1 is an axial section view of an example of a turbomolecular vacuum pump of the invention fitted with active magnetic bearings.
Figure 3:
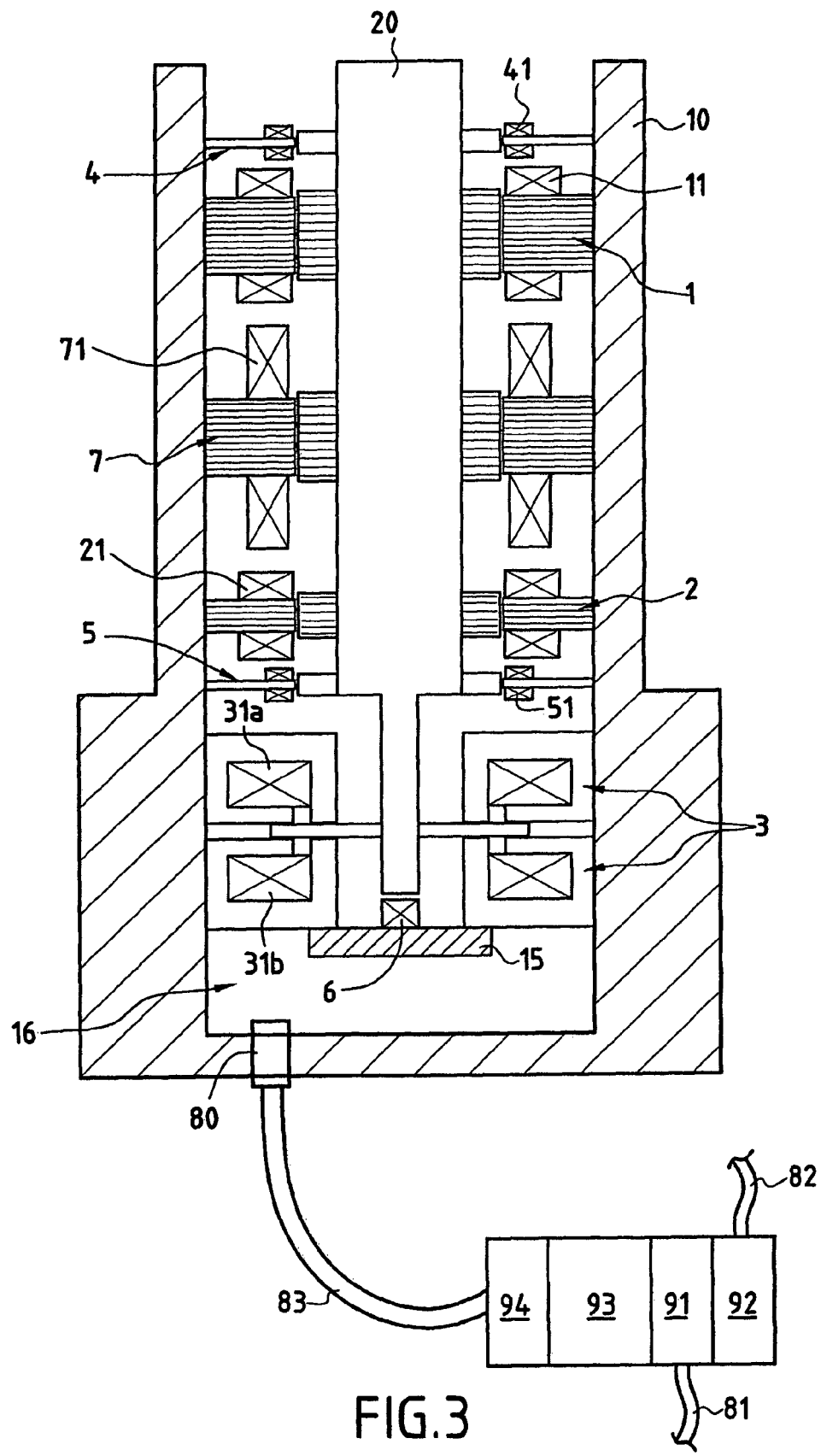
FIG. 3 is an axial section view of an example of a prior art turbomolecular vacuum pump.

FIG. 1 is a diagram of a particular embodiment of a turbomolecular vacuum pump of the invention. Those elements of this vacuum pump that are analogous or identical to elements of the prior art turbomolecular vacuum pump shown in FIG. 3 are given the same references preceded by the digit 1 (equivalent to adding 100). Thus, the radial magnetic bearings 101, 102 of FIG. 1 correspond to the radial magnetic bearings 1, 2 of FIG. 3. In the same manner, the axial magnetic thrust bearing 103, the radial detectors 104, 105, the axial detector 106, and the electric motor 107 correspond respectively to the axial magnetic thrust bearing 3, to the radial detectors 4, 5, to the axial detector 6, and to the electric motor 7, such that these elements are not described again.

The general configuration of the FIG. 1 vacuum pump with the leaktight enclosure 110 defining a chamber 116 containing a primary vacuum in which the rotor 120 is received and rotated by the electric motor 107 and supported by the active magnetic suspension remains similar to that of the prior art vacuum pump of FIG. 3. In both figures, the elements of the vacuum pump that are driven by the rotor 120 are omitted and are conventional. The structure of the rotor 120 in the form of a vertical cylinder is given purely by way of example and other forms of rotor can be selected, e.g. a bell-shaped rotor as in U.S. Pat. No. 4,023,920.

As mentioned above, the structure of the electric motor 107 and its windings 171, the structure of the radial magnetic bearings 101, 102 and their windings 111, 121, the structure of the axial bearing 103 and its windings 131a, 131b, and indeed the structure of the radial detectors 104, 105 and their windings 141, 151 and the structure of the axial detector 106 carried by the support 115 can all remain conventional.

The invention makes it possible to optimize the connections between the coils of said drive, support, or detector elements (motor 107, bearings 101, 102, 103, detectors 104, 105, 106) and the circuits of the control unit 191, 192, 193, 194 of functions that remain unchanged, but that are arranged in a particular manner that makes it easier and less expensive to manufacture the pump as a whole.

In the invention, the turbomolecular vacuum pump proper is maintained at a distance from the general electrical power supply circuits 191 for powering the electric motor 107 and the axial and radial magnetic bearings 103 and 101, 102. The power supply circuits 191 develop high power and are connected to a conventional main power supply so as to avoid disturbing the environment of the vacuum pump, and they require a connection cable 183 that is inexpensive since it contains only two or three wires.

The circuits 192 providing a communications interface with a system external to the vacuum pump via an interface cable 182 can likewise remain external since their connection with the vacuum pump requires the presence of only one wire, or at most of two wires.

Figure 2:
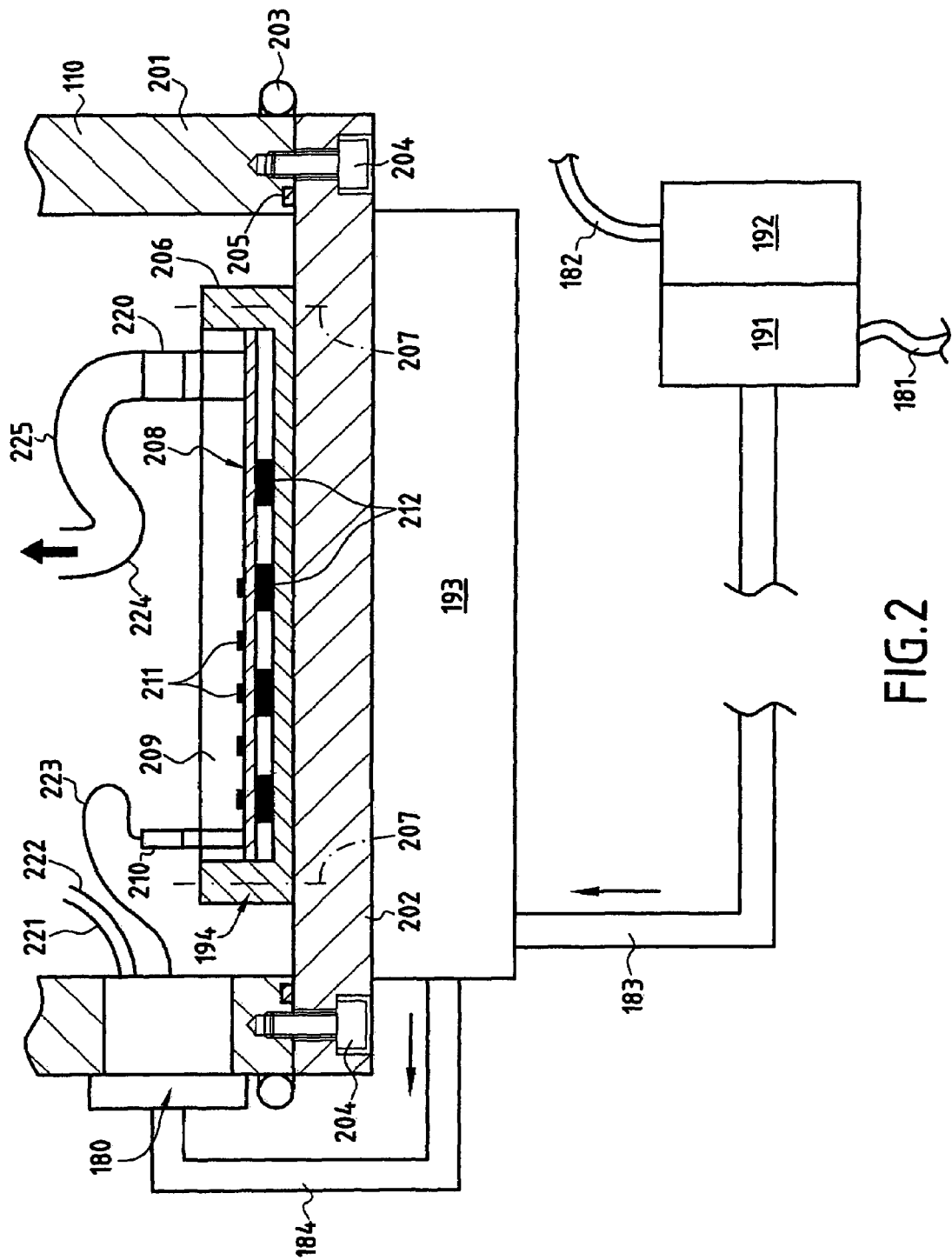
FIG. 2 is a detail view showing the circuit for controlling the active magnetic bearings incorporated inside the enclosure of the vacuum pump, in a particular embodiment of the invention.

In contrast, the circuits 193 for controlling the electric motor are advantageously mounted on a bottom plate of the enclosure 110, on the outside thereof (FIGS. 1 and 2). As a result, the connection cable 183 between the motor-controlled circuits 193 and the remote external circuits 191, 192 need have only two or three wires, while the connection cable 184 between the electric motor control circuits 193 and the leaktight connector 180 need have no more than five to seven wires and remains very short in length. The heat given off by the electric motor control circuits 193 can easily be radiated away providing the power dissipated is of the order of a few tens of watts up to a few hundreds of watts.

In the invention, the circuits 194 for controlling the axial and radial magnetic bearings 103 and 101, 102 on the basis of signals issued by the axial and radial detectors 106 and 104, 105 are disposed in a unit 206 (FIG. 2) placed inside the enclosure 110 in the primary vacuum chamber 116. As a result, all of the connections between the detectors 104, 105, and 106 and the active magnetic bearings 101, 102, and 103 take place inside the enclosure 110, and only one or two electric wires are needed to power these elements electrically.

The leaktight connector 180 can thus easily make do with a number of connection points that is less than ten, e.g. lying in the range five to seven connection points, thereby ensuring it is much simpler to make.

As can be seen in particular in FIG. 2, the control circuits 194 for the magnetic bearings are disposed in a metal unit 206 which may advantageously be made of aluminum and which is secured by connection means 207, represented symbolically in FIG. 2, onto a bottom plate 202 of the enclosure 110, and this bottom plate 202 may also be made of aluminum, preferably being secured in releasable manner using connection means 204 to the vertical wall 201 of the enclosure 110. A gasket 205 provides sealing between the bottom plate 202 and the vertical wall 201 of the enclosure 110.

The outside bottom surface of the removable bottom plate 202 can thus carry the circuits 193 for controlling the motor, while its top surface on the inside carries the circuits 194 for controlling the magnetic bearings.

A cooling circuit 203 outside the pump preferably surrounds the portion of the enclosure 110 in which the magnetic bearing control circuits 194 are housed. This cooling circuit may be conventional and comprises a tube for circulating a cooling liquid.

The leaktight connector 180 may be placed in the bottom plate 202, or as shown in FIG. 2, in the bottom portion of the vertical wall 201 of the enclosure 110. In FIG. 2, it can be seen that the leaktight connector 180 has a minimum of wires penetrating to the inside of the enclosure 110, and specifically essentially two wires 221 and 222 for powering the motor 107 and one or two wires 223 for powering the bearing control circuits 194, and possibly also a wire providing a connection with the interface for communicating with a system external to the vacuum pump.

The circuits 194 for controlling the bearings are also connected via a connector 220 having a larger number of wires 224, 225 leading to the windings 111, 121, 131a, 131b of the magnetic bearings and to the detectors 104, 105, and 106. These connections are all situated inside the enclosure 110 so the connector 220 does not need to be leaktight and can be made in simple manner, as can the connector 210 providing a connection with the power supply wire 223.

The magnetic bearing control circuits 194 may include a plate 208 having a bottom face facing towards the wall of the enclosure 110 and carrying electronic power components 212 for powering the axial and radial magnetic bearings 103 and 101, 102, and having a top face facing towards the inside of the enclosure 110 carrying components 211 for processing the signals delivered by the axial and radial detectors 106 and 104, 105. This disposition makes it easier to dump the heat produced by the magnetic bearing control circuits 194.

The magnetic bearing control circuits 194 present relatively low power, of the order of 100 watts or even less, such that incorporating them in the primary vacuum portion of the pump does not require any modification to the basic shape of the enclosure. Since the electronic card(s) 208 carrying the magnetic bearing control circuits 194 is/are mounted directly on the metal bottom plate 202 which then constitutes a housing therefor, or via a metal unit 206, itself in contact with the bottom plate 202 of the vacuum pump, it suffices to provide the limited amount of cooling that is needed, where this cooling can be boosted by the presence of a general pump cooler system 203 in the vicinity of the base of the enclosure 110.

The magnetic bearing control circuits 194 are embedded in a bubble-free resin that has previously been degassed so as to perform functions of sealing and making temperature uniform, and possibly also of conducting heat so as to mitigate the drawbacks of being located in a vacuum where pressure might possibly vary suddenly.

Because the magnetic bearing control circuits 194 are selectively integrated in the primary vacuum of the turbomolecular vacuum pump, the number of contacts in the leaktight connector 180 can thus be reduced from a typical value of 54 contacts to five to seven contacts (the contacts needed for powering and controlling the motor, for powering the magnetic bearings, and for providing a connection with the interface unit 192). Maintenance remains easy, merely by disassembling the bottom plate 202. The components of the magnetic bearing control circuits 194 that are located in the vacuum remain protected against sudden variations in the pressure of the vacuum because they are embedded in the bottom plate closing the pump, and the embedding can serve to improve temperature and temperature uniformity.

Naturally, variant embodiments could be envisaged, for example the circuits 193 for controlling the motor could remain remote, being in the vicinity of the power supply circuits 191 and the interface circuits 192. Under such circumstances, there is only one connection cable 184 between the leaktight connector 180 having a smaller number of contacts (less than eight) and all of the remote circuits 191, 192, 193, and the connection cable 184 can still have no more than seven wires, thus enabling it to be made inexpensively.

The invention claimed is:

1. A turbomolecular vacuum pump having active magnetic bearings, the pump comprising an enclosure defining a primary vacuum chamber, a rotor mounted inside the enclosure, an electric motor for rotating the rotor relative to the enclosure, at least one axial magnetic bearing, and at least one radial magnetic bearing for supporting the rotor relative to the enclosure, at least one axial detector for detecting the axial position of the rotor relative to the enclosure, at least one radial detector for detecting the radial position of the rotor relative to the enclosure, a hermetic leaktight electrical connector mounted in the wall of the enclosure, and at least one electric cable providing a connection with remote external electric circuits associated with the electric motor, and with the axial and radial magnetic bearings, the pump being characterized in that the remote external electric circuits associated with the electric motor and with the axial and radial magnetic bearings essentially comprise general power supply circuits for electrically powering the electric motor and the axial and radial magnetic bearings, in that circuits for controlling the axial and radial magnetic bearings on the basis of signals issued by the axial and radial detectors are embedded in a resin and placed inside the enclosure in the primary vacuum chamber, and in that the leaktight electrical connector and the electric cable providing a connection with the remote external electric circuits each comprises a number of connection wires that is less than ten.

2. A turbomolecular vacuum pump according to claim 1, characterized in that the remote external electric circuits further comprise circuits providing a communications interface with a system external to the vacuum pump.

3. A turbomolecular vacuum pump according to claim 1, characterized in that it includes circuits for controlling the electric motor that are mounted on a bottom plate of the enclosure on the outside thereof, in that the connection electric cable comprises a first connection cable between the leaktight electrical connector and the circuits for controlling the electric motor, and a second connection cable between the circuits for controlling the electric motor and the remote external electric circuits, and in that the first connection cable has a number of connection wires that is less than ten, while the second connection cable has a number of connection wires that is less than five.

4. A turbomolecular vacuum pump according to claim 3, characterized in that the first connection cable has a number of connection wires that is less than eight, while the second connection cable has a number of connection wires that is less than four.

5. A turbomolecular vacuum pump according to claim 1, characterized in that the circuits for controlling the axial and radial magnetic bearings are placed in the bottom of the enclosure.

6. A turbomolecular vacuum pump according to claim 1, characterized in that a cooling circuit external to the pump surrounds a portion of the enclosure housing the circuits for controlling the axial and radial magnetic bearings.

7. A turbomolecular vacuum pump according to claim 1, characterized in that the circuits for controlling the axial and radial magnetic bearings include a plate having a bottom face facing towards the wall of the enclosure and carrying power components for powering the axial and radial magnetic bearings, and a top face facing towards the inside of the enclosure and carrying components for processing signals issued by the axial and radial detectors.

8. A turbomolecular vacuum pump according to claim 1, characterized in that the circuits for controlling the axial and radial magnetic bearings are placed in an aluminum housing.

9. A turbomolecular vacuum pump according to claim 1, characterized in that the circuits for controlling the axial and radial magnetic bearings are mounted on a removable bottom plate of the enclosure, inside the enclosure.

10. A turbomolecular vacuum pump according to claim 3, characterized in that the bottom plate of the enclosure is made of aluminum.

11. A turbomolecular vacuum pump according to claim 1, characterized in that it has two radial magnetic bearings disposed on either side of the electric motor.

12. A turbomolecular vacuum pump according to claim 9, characterized in that the bottom plate of the enclosure is made of aluminum.

* * * * *